United States Patent [19]

Kanakura et al.

[11] Patent Number: 5,384,226
[45] Date of Patent: Jan. 24, 1995

[54] PROCESS FOR PRODUCING TONER

[75] Inventors: Akihiro Kanakura, Hirakata; Takahito Kishida, Yao; Naoya Yabuuchi, Suita; Masayuki Maruta, Neyagawa, all of Japan

[73] Assignee: Nippon Paint Co., Ltd., Osaka, Japan

[21] Appl. No.: 852,266

[22] PCT Filed: Oct. 14, 1991

[86] PCT No.: PCT/JP91/01393

§ 371 Date: Jun. 8, 1992

§ 102(e) Date: Jun. 8, 1992

[87] PCT Pub. No.: WO92/07304

PCT Pub. Date: Apr. 30, 1992

[30] Foreign Application Priority Data

Oct. 15, 1990 [JP] Japan .................. 2-277400

[51] Int. Cl.$^6$ ............................. G03G 9/087
[52] U.S. Cl. ................. 430/137; 430/110; 524/460
[58] Field of Search ............ 430/137, 110; 524/460; 523/206, 215

[56] References Cited

U.S. PATENT DOCUMENTS 3,876,610 4/1975 Timmerman et al. ........... 260/42.21
4,777,104 10/1988 Matsumoto et al. ............. 430/137

FOREIGN PATENT DOCUMENTS 0162577 11/1985 European Pat. Off. .
60-23859 2/1985 Japan .
62-73276 4/1987 Japan .
63-103265 5/1988 Japan .
2070029 9/1981 United Kingdom ............... 430/137

OTHER PUBLICATIONS

NIPA, Japanese Patents Abstracts, Week 8938, Derwent, AN 89-275345 (38), JP-A-1,201,676 (Aug. 14, 1989).

*Primary Examiner*—Christopher D. Rodee
*Attorney, Agent, or Firm*—Wenderoth, Lind & Ponack

[57] ABSTRACT

The present invention provides a process for producing toner particles having small particle size and small particle size distribution which uniformly contain a polyolefin wax in high yield by a simple process. That is, according to the present invention, there is provided a process for producing a toner which comprises dissolving or dispersing a polymerizable composition comprising:

(I) a vinyl monomer,
(II) an acrylic resin-grafted polyolefin, and
(III) a colorant in a dispersion solvent and then polymerizing it, wherein no resin deposition occurs when the acrylic resin-grafted polyolefin (II) is dissolved or dispersed in a mixed solution of one volume of the vinyl monomer (I) and two or more volumes of the dispersion solvent.

2 Claims, No Drawings

PROCESS FOR PRODUCING TONER

TECHNICAL FIELD

The present invention relates to a process for producing a toner for developing an electrostatic latent image formed in an electrophotography method, an electrostatic recording method, an electrostatic printing method and the like. More particularly, it relates to a process for producing a toner composition having small particle size and small particle size distribution in high yield by a simple process, said toner composition containing a release agent component in toner particles by formulating an acrylic resin-grafted polyolefin upon a non-aqueous dispersion polymerization.

BACKGROUND

As a method for producing a polymerized toner, for example, there is proposed a suspension polymerization method wherein a polymerizable composition is dispersed in an aqueous medium and then polymerized, as described in Japanese Patent Kokai 1-201676. This suspension polymerization method requires no pulverization, and a colorant and an additive are uniformly dispersed in comparison with a conventional method.

However, a polymerized toner obtained by this method normally has a large particle size (5 to 15µ) and has large particle size distribution. Therefore, a classifying step is required. When a toner having small particle size (3 to 7µ) which has recently been required is produced, yield is lowered.

As a method for producing a toner having a small particle size, for example, there is proposed a method based on a non-aqueous dispersion polymerization which comprises polymerizing vinyl monomers in the presence of a colorant in a dispersion solvent to which the vinyl monomers are soluble and polymerized particles therefrom are insoluble, as described in Japanese Patent Kokai Nos. 61-273552 and 62-73276.

However, in this method, there is not disclosed an improvement for finely dispersing a colorant and an additive to polymerize them and, therefore, it is remarkably difficult to allow a release agent which prevents a toner from adhering to a fixing roll to be uniformly present in polymerized particles. The release agent has no affinity with a dispersion solvent and, therefore, the release agent agglomerates in a polymerization system and deposits apart from polymerized particles, whereby, it is not practicable to contain the release agent in polymerized particles.

In Japanese Patent Kokai No. 1-137264, there is disclosed a technique for encapsulating a release agent and a polymer in toner particles, however, all possible production processes are listed and a suitable one is not specified. The polymer component described therein is not uniformly dissolved or dispersed in a dispersion solvent. Therefore, it is difficult to uniformly contain the release agent in polymerized particles, whereby, the resulting toner has large particle size distribution and comparatively large particle size.

DISCLOSURE OF THE INVENTION

An object of the present invention is to provide a process for producing toner particles having small particle size and small particle size distribution which uniformly contain a polyolefin wax in high yield by a simple process.

It has been found that, if polyolefin wax is stably present in a polymerization solvent in a fine dispersion state, the above object can be obtained, and the present invention has been completed.

That is, according to the present invention, there is provided a process for producing a toner which comprises dissolving or dispersing a polymerizable composition comprising:

(I) a vinyl monomer,
(II) an acrylic resin-grafted polyolefin, and
(III) a colorant in a dispersion solvent and then polymerizing it, wherein no resin deposition occurs when the acrylic resin-grafted polyolefin (II) is dissolved or dispersed in a mixed solution of one volume of the vinyl monomer (I) and two or more volumes of the dispersion solvent.

As the vinyl monomer (I) used in the present invention, for example, there are ethylenically unsaturated monoolefins such as ethylene, propylene, butylene, isobutylene and the like; halogenated vinyls such as vinyl chloride, vinylidene chloride, vinyl bromide, vinyl fluoride and the like; vinyl esters such as vinyl acetate, vinyl butyrate and the like; (meth)acrylates such as methyl (meth)acrylate, ethyl (meth)acrylate, n-butyl (meth)acrylate, octyl (meth)acrylate, 2-ethylhexyl (meth)acrylate, phenyl (meth)acrylate, diethylaminoethyl (meth)acrylate and the like; derivatives of (meth)acrylic acid such as (meth)acrylonitrile, (meth)acrylamide and the like; and styrenes such as styrene, o-methylstyrene, m-methylstyrene, p-methylstyrene, p-methoxystyrene, p-phenylstyrene, p-chlorostyrene and the like and derivatives thereof.

In order to control a melting viscosity of the toner, a crosslinking agent may be copolymerized. As the crosslinking agent, for example, a normal polyvinyl monomer such as divinylbenzene, divinylnaphthalene, divinyl ether, ethylene glycol di(meth)acrylate, diethylene glycol di(meth)acrylate, 1,3-butyl glycol di(meth)acrylate, 1,6-hexane glycol di(meth)acrylate, neopentyl glycol di(meth)acrylate, 2,2'-bis(4-methacryloxydiethoxyphenyl)propane, trimethylolpropane (meth)acrylate, tetramethylolmethane tetra(meth)acrylate, diallyl phthalate and the like can be appropriately used.

The acrylic resin-grafted polyolefin (II) used in the present invention is that in which polyolefin as a main chain is grafted with an acrylic resin, and it can be synthesized by various methods. Preferably, as disclosed in Japanese Patent Kokai No. 64-36614, it may be obtained by polymerizing a polymerizable monomer alone or copolymerizing the polymerizable monomer which forms acrylics under the presence of polyolefin.

It is preferred that the weight-average molecular weight of the polyolefin as the main chain is 500 to 50,000, particularly 1,000 to 20,000. When the molecular weight is less than 500, the blocking resistance of the toner is lowered. When it exceeds 50,000, the solubility to the vinyl monomer (I) is lowered. Examples of polyolefin include polyethylene, polypropylene and the like.

It is significant that no resin is deposited when the acrylic resin-grafted polyolefin (II) used in the present invention is dissolved or dispersed in a mixed solution of one volume of the vinyl monomer (I) and two or more volumes of the dispersion solvent. When the resin is deposited in a mixed solution of one volume of the vinyl monomer (I) and two or more volumes of the dispersion solvent, the acrylic resin-grafted polyolefin (II) agglomerates in a polymerization system and the release agent deposits apart from polymerized particles, whereby, it is not practicable to contain the release agent in polymerized particles.

Therefore, it is preferred that the polymerizable monomer for forming an acrylic resin as a graft chain contains a monomer having a polar functional group in an amount of 0.1 to 40% by weight, particularly 3.0 to 30% by weight. Examples of the monomer having a polar functional group include a polymerizable monomer having an ethylenically unsaturated bond. For example, hydroxyl group-containing monomers such as hydroxyethyl(meth)acrylate, hydroxypropyl(meth)acrylate and the like; carboxy group-containing monomers such as (meth)acrylic acid, maleic acid, fumaric acid, crotonic acid, itaconic acid and the like; amino group-containing (meth)acrylates such as dimethylaminoethyl (meth)acrylate, diethylaminoethyl (meth)acrylate and the like; N-substituted (meth)acrylamides such as N-methylol(meth)acrylamide, N-butoxymethyl (meth)acrylamide and the like; epoxy group-containing monomers such as glycidyl (meth)acrylate and the like; and N-vinylpyrrolidone and acrylonitrile can be used alone or in combination thereof.

As the remainder of the polymerizable monomer for forming an acrylic resin, for example, there are styrenes such as styrene, chlorostyrene, vinylstyrene and the like; vinylesters such as vinyl acetate, vinyl propionate, vinyl butyrate and the like; (meth)acrylates such as methyl (meth)acrylate, ethyl (meth)acrylate, n-butyl (meth)acrylate, octyl (meth)acrylate and the like; vinyl ethers such as vinyl ether, vinyl ethyl ether, vinyl butyl ether and the like.

It is preferred that the weight-average molecular weight of the acrylic resin-grafted polyolefin (II) prepared from the above mentioned polyolefin and the polymerizable monomer is 3,000 to 200,000, particularly 5,000 to 100,000. When the molecular weight is less than 3,000, the blocking resistance of the toner is lowered. When it exceeds 200,000, the fixing property is lowered. The graft amount of the acrylic resin is preferably 5 to 90% by weight based on 10 parts by weight of polyolefin. When the amount is less than 5% by weight, the solubility to the vinyl monomer (I) is lowered and the stability upon polymerization becomes inferior. When the amount exceeds 90% by weight, no effect for improving offset of polyolefin is obtained.

It is preferred that the amount of the acrylic resin-grafted polyolefin (II) is 1 to 50% by weight, particularly 5 to 30% by weight based on the vinyl monomer (I). When the amount is less than 1%, no offset resistance upon fixing is obtained. When the amount exceeds 50% by weight, the acrylic resin-grafted polyolefin (II) agglomerates in a polymerization system and the release agent deposits apart from polymerized particles, whereby, it is not practicable to contain the release agent in polymerized particles.

The colorant (III) used in the present invention may be a known material for toner. Examples thereof include carbon black, nigrosine dye, phthalocyanine blue, aniline blue, chrome yellow, quinoline yellow, Du Pont oil red, rose bengal and the like. The amount of the colorant (III) is preferably 5 to 30% by weight based on the vinyl monomer (I).

Further, additives such as pigment dispersants, antistatic agents, magnetic particles and the like may be added no the polymerizable composition of the present invention.

The polymerizable composition is prepared by uniformly mixing the above mentioned components by a known dispersion mixer such as sand mill, roll mill, ball mill and the like.

The toner of the present invention is produced by dissolving or dispersing the above mentioned polymerizable composition in a dispersion solvent under the presence of a dispersion stabilizer, followed by polymerizing.

The dispersion solvent may be any organic solvent which satisfies a solubility or dispersibility of the acrylic resin-grafted polyolefin II), to which resin particles formed by polymerization are insoluble and the vinyl monomer as well as dispersion stabilizer are soluble. As the organic solvent, for example, there is an alcoholic or an ether alcoholic solvent. Examples of the alcoholic solvent include methanol, ethanol, n-propanol, isopropanol, n-butanol, i-butanol, t-butanol, n-hexanol, cyclohexanol, ethylene glycol, propylene glycol, dipropylene glycol and the like. Examples of the ether alcoholic solvent include ethylene glycol monomethyl ether, ethylene glycol monoethyl ether, ethylene glycol monobutyl ether, propylene glycol monomethyl ether, propylene glycol monoethyl ether, propylene glycol monobutyl ether, diethylene glycol monomethyl ether, diethylene glycol monoethyl ether, diethylene glycol monobutyl ether, dipropylene glycol monomethyl ether, dipropylene glycol monoethyl ether and the like. The organic solvent may be a mixture of the above solvents. Further, if necessary, water may be added in an amount of up to 50% by weight based on the total solvent. The dispersion stabilizer may be anyone which is soluble to the above mentioned dispersion solvent arid examples thereof include cellulose stabilizers (e.g. hydroxyethyl cellulose, hydroxypropyl cellulose, cellulose acetate butyrate, hydroxypropylmethyl cellulose, cellulose propionate, etc.), polyvinyl alcohol stabilizers (e.g. polyvinyl acetate, ethylene-vinyl alcohol copolymer, vinyl alcohol-vinyl acetate copolymer, etc.), polymerizable polymers (e.g. polyvinyl pyrrolidone, polyacrylic acid, polyvinyl methyl ether, acrylic resin, styrene-acrylic resin, etc.), condensation polymerizable polymers (e.g. polyester resin, polyethylene-imine, etc.) and the like. Further, an amphoionic group-containing resin (e.g. amphoionic group-containing polyester and amphoionic group-containing epoxy produced in Japanese Patent Kokai Nos. 56-51727 and 57-40522, respectively) can also be used in the present invention. For the purpose of improving the stability of dispersion polymerization and decreasing the particle size distribution, the dispersion stabilizer may be those containing a radical polymerizable group or a chain transfer group as disclosed in Japanese Patent Kokai No. 63-30400. The dispersion polymerization stabilizer is normally used in an amount of B to 30% by weight based on the vinyl monomer (I), however, the amount is not limited to this range in order to obtain a desired particle size, deformation degree and stable polymerizability.

As the polymerization initiator, for example, there are peroxides such as benzoyl peroxide, di-t-butyl peroxide, cumene hydroperoxide, t-butylperoxy-2-ethylhexanoate and the like; azo compounds such as azobisisobutyronitrile, 2,2'-azobis(2,4-dimethylvaleronitrile), 2,2'-azobis(4-methoxy-2,4-dimethylvaleronitrile), dimethyl-2,2'-azobisisobutyrate and the like. They are used alone or in combination thereof. The amount of the polymerization initiator is normally selected from the range of 0.1 to 15% by weight, preferably 0.5 to 10% by weight based on the vinyl monomer (I).

The polymerization may be conducted by a normal method. The polymerization conditions may be appropriately selected, for example, it may be conducted at 5° to 100° C. for 5 to 25 hours.

After completion of the polymerization, the reaction product is separated, washed, dried and pulverized by a normal method to obtain a toner of the present invention.

As described above, according to the present invention, a polymerized toner having the weight-average particle size of 3 to 10μ and small particle size distribution which uniformly contains polyolefin can be easily obtained. Further, since the toner contains polyolefin wax in toner particles, other release agent is not required on fixing.

EXAMPLE

The following Production Examples, Examples, Comparative Examples and Experiment Examples further illustrate the present invention in detail but are not to be construed to limit the scope thereof. All "parts" hereinafter are by weight unless otherwise stated.

Production Example 1

Synthesis of Acrylic Resin-Grafted Polyolefin

A nitrogen-substituted glass reactor was charged with 15 parts of xylene, 5 parts of ethyl cellosolve acetate, 10 parts of Biscoal 660P having an average molecular weight of 3,000 (available from Sanyo Kasei Kogyo K.K.), 25 parts of styrene, 15 parts of n-butyl acrylate (n-BA) and 5 parts of hydroxyethyl methacrylate and uniformly dissolved with stirring at 120° to 150° C. under pressure. Then, a mixed solution of 2 parts of Kaiester PH (available from Kayaku Nuri K.K.), 10 parts of xylene and 5 parts of ethyl cellosolve is successively incorporated in the mixture to conduct polymerization. The polymerization was completed by maintaining at the same temperature for 3 hours after the incorporation. After 10 parts of triethylene glycol monomethyl ether was added to the resulting polymerization product and mixed at room temperature, the volatile content was distilled off under reduced pressure to obtain acrylic resin-grafted polyolefin A.

According to the same manner as that described above, each acrylic resin-grafted polyolefin A to F shown in Table 1 was synthesized, respectively. Regarding acrylic resin-grafted polyolefins A, B, C, D and E, no resin was deposited in a mixed solution of one volume of the vinyl monomer shown in each example and five volumes of the dispersion solvent. However, regarding acrylic resin-grafted polyolefin F, a resin was deposited in a mixed solution of one volume of the vinyl monomer and one volume of the dispersion solvent.

TABLE 1

| Acrylic resin-grafted polyolefin | Composition (parts by weight) | | | |
|---|---|---|---|---|
| | Biscoal 660P | Styrene | n-BA | Monomer having polar functional group |
| A | 10 | 25 | 10 | Hydroxyethyl methacrylate (5) |
| B | 10 | 20 | 10 | Hydroxyethyl methacrylate (10) |
| C | 20 | 25 | 10 | Hydroxyethyl methacrylate (5) |
| D | 10 | 25 | 10 | Vinyl pyrrolidone (5) |
| E | 10 | 25 | 13 | Methacrylic acid (2) |

TABLE 1-continued

| Acrylic resin-grafted polyolefin | Composition (parts by weight) | | | |
|---|---|---|---|---|
| | Biscoal 660P | Styrene | n-BA | Monomer having polar functional group |
| F | 10 | 30 | 10 | — |

Production Example 2

Preparation of Acrylic Resin Graft Polyolefin/Carbon Black Paste Dispersion

20 Parts of acrylic resin-grafted polyolefin synthesized in Production Example 1, 15 parts of Laven 14 powder (available from Colombia Co.), 30 parts of styrene, 30 parts of n-butyl methacrylate, 7 parts of a resin for dispersing carbon having an amine value of 1 mmole/g and an average molecular weight of 12,000 (available from Nippon Paint K.K.) and 300 parts of glass beads were cooled to 15° C. and then dispersed for 3 hours by a sand mill. Then, glass beads were removed to prepare an acrylic resin-grafted polyolefin/carbon black paste dispersion.

Example 1

Production of Toner

A one liter flask equipped with a stirrer, a thermometer, a thermal control bar and a condenser was charged with 320 parts of n-propyl alcohol, 80 parts of deionized water, 15 parts of a partial saponification product of polyvinyl acetate and 100 parts of an acrylic resin-grafted polyolefin A/carbon black paste dispersion prepared in Production Example 2 and heated to 85° C. 2 Parts of lauroyl peroxide and 40 parts of a solution of 1,1'-azobis(cyclohexane-1-carbonitrile) (available from Wako Junyaku Kogyo K.K. as V-40, 4 parts) in styrene were added to the mixture, which was reacted at 85° C. for 18 hours. In a reaction system, no deposit of acrylic resin-grafted polyolefin and no sedimented residue were admitted. After the reaction product was centrifuged, the precipitate was washed with methanol, dried and pulverized to obtain a polymerized toner having the weight-average particle size of 6.2μ and the variation coefficient of 21% which contains acrylic resin-grafted polyolefin.

Example 2

According to the same manner as that described in Example 1 except for using acrylic resin-grafted polyolefin B instead of acrylic resin-grafted polyolefin A of Example 1, a polymerized toner having the weight-average particle size of 7.3μ and the variation coefficient of 23% which contains acrylic resin-grafted polyolefin B.

Example 3

According to the same manner as that described in Example 1 except for using acrylic resin-grafted polyolefin C instead of acrylic resin-grafted polyolefin A of Example 1, a polymerized toner having the weight-average particle size of 8.0μ and the variation coefficient of 25% which contains acrylic resin-grafted polyolefin C.

Example 4

A one liter flask equipped with a stirrer, a thermometer, a thermal control bar and a condenser was charged with 350 parts of isopropyl alcohol, 50 parts of deionized water, 15 parts of a partial saponification product of polyvinyl acetate and 100 parts of an acrylic resin-grafted polyolefin D/carbon black paste dispersion prepared in Production Example 2 and heated to 100° C. 40 Parts of a solution of 2,2'-azobisisobutyronitrile) (available from Wako Junyaku Kogyo K.K. as V-60, 3 parts) in styrene were added to the mixture, which was reacted at 70° C. for 18 hours. In a reaction system, no deposit of acrylic resin-grafted polyolefin and no sedimented residue were admitted. After the reaction product was centrifuged, the precipitate was washed with methanol, dried and pulverized to obtain a polymerized toner having the weight-average particle size of $5.2\mu$ and the variation coefficient of 24% which contains acrylic resin-grafted polyolefin D.

Example 5

A one liter flask equipped with a stirrer, a thermometer, a thermal control bar and a condenser was charged with 350 parts of isopropyl alcohol, 50 parts of deionized water, 15 parts of a partial saponification product of polyvinyl acetate, 4 parts of polyvinyl pyrrolidone and 100 parts of an acrylic resin-grafted polyolefin E/carbon black paste dispersion prepared in Production Example 2 and heated to 70° C. 40 Parts of a solution of 2,2'-azobisisobutyronitrile) (available from Wako Junyaku Kogyo K.K. as V-60, 3 parts) in styrene were added to the mixture, which was reacted at 70° C. for 18 hours. In a reaction system, no deposit of acrylic resin-grafted polyolefin and no sedimented residue were admitted. After the reaction product was centrifuged, the precipitate was washed with methanol, dried and pulverized to obtain a polymerized toner having the weight-average particle size of $7.9\mu$ and the variation coefficient of 26% which contains acrylic resin-grafted polyolefin E.

Comparative Example 1

According to the same manner as that described in Example 1 except for using acrylic resin-grafted polyolefin F instead of acrylic resin-grafted polyolefin A of Example 1, the polymerization was completed. During polymerization, a deposit was admitted on the wall of a flask. Further, a lot of agglomerates were observed in the polymerization product.

After the reaction product was centrifuged, the precipitate was washed with ethanol, dried and pulverized to obtain a polymerized toner having the weight-average particle size of $14\mu$ and the variation coefficient of 42%.

Experiment Example 1

To 100 parts of a carrier prepared by coating a styrene-methyl methacrylate copolymer on the surface of a spherical ferrite having an average particle size of $70\mu$, 3 parts of each toner of Examples 1 to 5 and Comparative Example 1 was mixed to prepare a developing agent, respectively. By using a duplicator (available from Sharp Co. as SF-800), an offset test was conducted. The results show that Examples 1, 3, 4 and 5 exhibited no offset phenomenon.

What is claimed is:

1. A process for producing a toner which comprises dissolving or dispersing a polymerizable composition comprising:
   (I) a vinyl monomer,
   (II) an acrylic resin-grafted polyolefin in which the acrylic resin graft contains monomer units having a polar functional group in an amount of 0.1 to 40% by weight, said monomer units being derived from monomers selected from the group consisting of hydroxyl group-containing monomers, carboxy group-containing monomers, amino group-containing (meth)acrylates, N-substituted (meth)acrylamides, epoxy group-containing monomers, N-vinylpyrrolidone, acrylonitrile and mixtures thereof, and
   (III) a colorant in a dissolution or dispersion solvent and then polymerizing it, wherein no deposition of said acrylic resin-grafted polyolefin (II) occurs when said acrylic resin-grafted polyolefin (II) is dissolved or dispersed in a mixed solution of one volume of said vinyl monomer (I) and two or more volumes of said dissolution or dispersion solvent.

2. The process for producing a toner according to claim 1, wherein the acrylic resin-grafted polyolefin (II) is formulated in an amount of 1 to 50% by weight based on the vinyl monomer (I).

* * * * *